United States Patent Office 2,998,316
Patented Aug. 29, 1961

2,998,316
PROCESS OF IMPROVING THE FLOW CHARACTERISTICS OF AN INSTANT COFFEE COMPOSITION
Ismar M. Reich, Stamford, Conn., assignor to Standard Brands Incorporated, New York, N.Y., a corporation of Delaware
No Drawing. Filed Dec. 9, 1958, Ser. No. 779,050
7 Claims. (Cl. 99—71)

This invention relates to soluble or instant coffee. More particularly, it relates to soluble or instant coffee of improved aroma and flavor which is free-flowing.

Instant coffee having the desired free-flowing character is commonly prepared by spray drying a water extract of roasted coffee. Such instant coffee is characterized by lack of a great deal of the flavor and aroma usually associated with freshly brewed roasted coffee. It has been proposed to improve the aroma and flavor of such instant coffee by incorporating therein coffee oil containing aroma and flavor constituents of roasted coffee obtained from the roasted coffee prior to extracting it with water. The coffee oil may be obtained from the roasted coffee either by expression or by extraction with non-aqueous solvents. Many solvents have been proposed for this purpose, including for instance, hydrocarbons such as benzene, toluene, hexane, heptane, octane and chlorinated hydrocarbons in Cole U.S. Patent No. 2,542,119; sulphur dioxide, carbon dioxide and ammonia in Brandt U.S. Patent No. 2,345,378 and certain fluorinated compounds in my copending application Serial No. 755,133, filed August 15, 1958.

Unfortunately, the oily character of coffee oil causes the particles of the instant coffee to which it is added to adhere to one another. Consequently the product is not free-flowing and has an unattractive appearance. Because it is not free-flowing, it is difficult for the consumer to measure with a spoon the amount required to give a cup of coffee of the desired strength.

As the level of coffee oil is increased, the flavor and aroma intensity of the instant coffee is also increased, but its flow characteristics become poorer. Thus either flowability or flavor and aroma intensity had to be sacrificed in the prior art processes.

It has been proposed in the above mentioned Cole patent and in Gilmont U.S. Patent No. 2,563,233 to fractionate coffee oil to remove some of the oily materials before adding it to instant coffee. However, such additional processing usually results in an aroma and flavor extract of lower quality and intensity. Moreover, some of the oily materials are still present in the fractionated extract and reduce the flow characteristics of the instant coffee to which they are added.

An object of the invention is to improve the flow characteristics of an instant coffee whose flow characteristics have been reduced by the presence of added oily material.

A specific object of the invention is to improve the flow characteristics of spray dried instant coffee containing added coffee oil.

A further object of the invention is to provide a free-flowing instant coffee having the aroma and flavor usually associated with roasted coffee.

In accordance with the invention, a finely divided instant coffee, for instance, spray dried instant coffee and drum dried instant coffee, whose flow characteristics are reduced by admixture with an edible oily material, for instance, coffee oil derived from roasted coffee, has its flow characteristics improved by admixture with an instant coffee powder, the particles of which have a greater surface area per weight unit than the particles of the instant coffee to which it is added. This result can be obtained over a wide range of coffee oil levels without affecting the quality of the instant coffee and without the use of other additives. The coffee oil may be derived from roasted coffee, for instance by pressing or by extraction with any of the solvents disclosed in the aforementioned Cole, Brandt and Gilmont patents and my application Serial No. 755,133.

The added instant coffee powder may be a conventional spray dried instant coffee or it may be an instant coffee dried by other methods, for instance, by freeze drying or by drying a foamed water extract of roasted coffee as disclosed in U.S. Patent No. 2,788,276. The latter two products characteristically have a greater specific surface area than conventional spray dried instant coffee.

The added instant coffee powder may be produced from an instant coffee of larger particle size by grinding or milling, for instance, in ball mills or hammer mills. Other conditions being the same, the proportion of ground or milled instant coffee required to produce a given improvement in flow characteristics depends upon its particle size, i.e., the finer the particle size the smaller the proportion required. With a proper amount of particles of proper size the flow characteristics of the final mixture may be rendered substantially equal to those of the original untreated instant coffee. In the case of the conventional spray dried instant coffee, although the relatively large particles present or the relatively fine particles or a mixture of the two may be used for milling, it is preferable to mill the fine particles because the large particles are regarded as more attractive.

The instant coffee powder may be added to a mixture of the instant coffee to be treated and the oily aroma and flavor extract, or it may be added beforehand to either component of this mixture. The first method is preferred although satisfactory results are obtained by all three methods.

The invention is illustrated by the following examples:

*Example 1*

A free-flowing instant coffee was prepared in the conventional manner by spray drying a water extract of roasted coffee. A portion of this product was ball milled and then was mixed with 20% of its weight of an oily aroma and flavor extract obtained by extracting ground roasted coffee with dichlorodifluoromethane as a solvent and evaporating the solvent. This mixture was then diluted with another portion of the unmilled instant coffee until the level of the aroma and flavor extract in the resulting mixture was reduced to 1% by weight. The product so obtained was observed to have improved flow and spooning characteristics compared to a control sample made by mixing 99% by weight unmilled conventional spray dried instant coffee and 1% by weight aroma and flavor extract.

*Example 2*

A water extract of roasted coffee was spray dried in the conventional manner, the major portion of the dried product being collected from the main drying chamber or cone and the finer material being collected in a cyclone separator. The following results are typical of sieve analysis of the mixture of the two materials:

|  | Percent |
|---|---|
| On a 30 mesh sieve | 1.0 |
| On an 80 mesh sieve | 64.2 |
| Through an 80 mesh sieve | 34.8 |

23 pounds of the cyclone material were charged to a ceramic-lined ball mill, 20.5 inches long and 27 inches in inside diameter, together with 300 pounds of porcelain balls one-half inch in diameter. The mill was rotated at 41 r.p.m. for 30 minutes. One part by weight of the milled product was thoroughly mixed with 18.9 parts by weight of the product collected from the cone and 0.1 part by weight of an oily aroma and flavor extract prepared from roasted coffee in the manner described in Example 1. This product was compared for flow characteristics with a control sample which was of the same composition except that the cyclone product was not milled. The test was carried out by placing 100 grams of the first product in one jar and 100 grams of the second product in another identical jar. The mouth of each jar was covered with a 6-mesh sieve. The two jars were attached to a vibratory table, the jars were then inverted and the table vibrated. Measurement of the time required for the contents of the jars to be discharged showed that the control sample required 45 seconds whereas the other sample required only 13 seconds. The control sample had poor spooning characteristics whereas the other sample had good spooning characteristics like the original untreated spray dried product from which it was made.

It is well known that the particle size of a colored material can be characterized by its color; the lighter the color, the finer the powder. Color measurements made on the cyclone product used in this example indicated that it had a reflectance of 19.4% before milling and 55.5% after milling. The measurements were made on a Photovolt Lumetron colorimeter model 402E, using a No. 515 filter, after standardizing to a reflectance of 100% with a 37% reflectance plate.

*Example 3*

Instant coffee was prepared by extracting roasted coffee with hot water and drum drying the resultant extract under vacuum. A sieve analysis of the dried instant coffee gave the following results:

| | Percent |
|---|---|
| On a 30 mesh sieve | 2.0 |
| On an 80 mesh sieve | 51.0 |
| Through an 80 mesh sieve | 46.7 |

99.4 parts by weight of this instant coffee were intimately mixed with 0.6 part by weight of an oily aroma and flavor extract prepared from roasted coffee in the manner described in Example 1. Ten parts by weight of the mixture were then intimately mixed with one part by weight of spray dried instant coffee, which had been ball milled in a manner similar to that described in Example 2 to produce particles having a reflectance of 59.5%, measured as described in Example 2. The product so obtained was observed to have improved flow characteristics compared to a control sample made by mixing 99.5 parts by weight of the drum dried instant coffee and 0.5 part by weight of the oily aroma and flavor extract. This observation was made shortly after preparation of the samples. No appreciable change was detected when the samples were observed a day later.

The terms and expressions which have been employed are used as terms of description and not of limitation, and it is not intended, in the use of such terms and expressions to exclude any equivalents of the features shown and described or portions thereof, since it is recognized that various modifications are possible within the scope of the invention claimed.

I claim:
1. Process of improving the flow characteristics of an instant coffee composition which is not free-flowing comprising an intimate mixture of a free-flowing finely divided instant coffee and coffee oil which comprises including in the composition in thorough admixture with the components thereof an instant coffee powder having a greater surface area per weight unit than the said finely divided instant coffee component in an amount sufficient to render the final composition free-flowing.

2. Process of improving the flow characteristics of an instant coffee composition which is not free-flowing comprising an intimate mixture of a free-flowing spray dried instant coffee and coffee oil which comprises including in the composition in thorough admixture with the components thereof an instant coffee powder having a greater surface area per weight unit than the said spray dried instant coffee component in an amount sufficient to render the final composition free-flowing.

3. Process as defined by claim 2 wherein the added instant coffee powder is spray dried instant coffee.

4. Process as defined by claim 2 wherein the coffee oil is derived by pressing roasted coffee.

5. Process as defined by claim 2 wherein the coffee oil is derived from roasted coffee by extraction with a solvent.

6. Process of preparing a free-flowing instant coffee which comprises preparing a free-flowing instant coffee by spray drying a water extract of roasted coffee, reducing a part of the product to a finer particle size and incorporating this portion and a small amount of coffee oil with the main portion of the spray dried product, the amount of the product of finer particle size being sufficient to render the final composition free-flowing and the amount of coffee oil being such that without the said product of finer particle size the composition would not possess the free-flowing character.

7. Process of preparing a free-flowing instant coffee which comprises spray drying a water extract of roasted coffee to produce a free-flowing product composed of finer particles and larger particles, collecting the finer particles separately from the coarser particles, reducing the finer particles to a still finer size and incorporating them and a small amount of coffee oil with the coarser particles, the amount of the particles of reduced size being sufficient to render the final composition free-flowing, the amount of coffee oil being such that without the said finer particles the composition would not possess the free-flowing character.

References Cited in the file of this patent

UNITED STATES PATENTS

| | | |
|---|---|---|
| 735,777 | Kato | Aug. 11, 1903 |
| 1,263,434 | King | Apr. 23, 1918 |
| 2,345,378 | Brandt | Mar. 28, 1944 |
| 2,405,487 | Brandt | Aug. 6, 1946 |
| 2,542,119 | Cole | Feb. 20, 1951 |
| 2,557,294 | Kellogg | June 19, 1951 |
| 2,563,233 | Gilmont | Aug. 7, 1951 |